United States Patent
Wiegering et al.

(10) Patent No.: US 9,659,094 B2
(45) Date of Patent: May 23, 2017

(54) STORING FINGERPRINTS OF MULTIMEDIA STREAMS FOR THE PRESENTATION OF SEARCH RESULTS

(71) Applicant: AOL Inc., Dulles, VA (US)

(72) Inventors: Anthony Wiegering, Seattle, WA (US); Harmannus Vandermolen, Leesburg, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 14/993,038

(22) Filed: Jan. 11, 2016

(65) Prior Publication Data

US 2016/0125079 A1     May 5, 2016

Related U.S. Application Data

(63) Continuation of application No. 11/589,991, filed on Oct. 31, 2006, now Pat. No. 9,256,675.

(60) Provisional application No. 60/820,013, filed on Jul. 21, 2006, provisional application No. 60/820,712, filed on Jul. 28, 2006.

(51) Int. Cl.
| | |
|---|---|
| *G06F 17/30* | (2006.01) |
| *G06F 21/16* | (2013.01) |
| *G06F 17/22* | (2006.01) |
| *H04N 21/235* | (2011.01) |
| *H04N 21/278* | (2011.01) |

(52) U.S. Cl.
CPC .... *G06F 17/30784* (2013.01); *G06F 17/2235* (2013.01); *G06F 17/3053* (2013.01); *G06F 17/30153* (2013.01); *G06F 17/30864* (2013.01); *G06F 17/30887* (2013.01); *G06F 21/16* (2013.01); *H04N 21/2353* (2013.01); *H04N 21/278* (2013.01)

(58) Field of Classification Search
None
See application file for complete search history.

(56) References Cited

U.S. PATENT DOCUMENTS

| | | | |
|---|---|---|---|
| 5,751,286 A | 5/1998 | Barber et al. | |
| 5,828,839 A | 10/1998 | Moncreiff | |
| 5,835,087 A | 11/1998 | Herz et al. | |
| 6,049,806 A | 4/2000 | Crecine | |
| 6,112,203 A | 8/2000 | Bharat et al. | |
| 6,285,999 B1 | 9/2001 | Page | |
| 6,385,602 B1 | 5/2002 | Tso et al. | |

(Continued)

OTHER PUBLICATIONS

Berners-Lee et al., Uniform Resource Identifier (URI) Generic Syntax, Jan. 2005.

(Continued)

*Primary Examiner* — William Spieler
(74) *Attorney, Agent, or Firm* — Finnegan, Henderson, Farabow, Garrett & Dunner, L.L.P.

(57) ABSTRACT

Multimedia stream search results may be made perceivable to a user. A multimedia search query may be received from a user. The multimedia search query may be compared with information related to known multimedia streams and multimedia search results may be determined based on the comparison. A popularity of the multimedia streams corresponding to the multimedia stream search results may be determined based on a number of canonical URLs associated with the multimedia stream. A presentation of the multimedia stream search results to the user may be configured based on the popularity of the corresponding multimedia streams.

20 Claims, 10 Drawing Sheets

(56) References Cited

U.S. PATENT DOCUMENTS

| | | |
|---|---|---|
| 6,681,370 B2 | 1/2004 | Gounares et al. |
| 6,691,106 B1 | 2/2004 | Sathyanarayan |
| 6,785,671 B1 | 8/2004 | Bailey et al. |
| 6,823,370 B1 | 11/2004 | Kredo et al. |
| 6,901,207 B1 | 5/2005 | Watkins |
| 7,209,942 B1 | 4/2007 | Hori et al. |
| 7,281,220 B1 | 10/2007 | Rashkovskiy |
| 7,367,043 B2 | 4/2008 | Dudkiewicz et al. |
| 7,440,976 B2 | 10/2008 | Hart et al. |
| 2002/0069218 A1 | 6/2002 | Sull et al. |
| 2002/0133826 A1 | 9/2002 | Ohyama |
| 2002/0184336 A1 | 12/2002 | Rising, III |
| 2003/0235407 A1 | 12/2003 | Lord |
| 2004/0098754 A1 | 5/2004 | Vella et al. |
| 2004/0114571 A1 | 6/2004 | Timmins et al. |
| 2005/0091694 A1 | 4/2005 | Rambo |
| 2005/0114324 A1 | 5/2005 | Mayer |
| 2005/0114449 A1 | 5/2005 | Verhaeghe et al. |
| 2005/0128361 A1 | 6/2005 | Li et al. |
| 2005/0144086 A1 | 6/2005 | Speiser et al. |
| 2006/0059134 A1 | 3/2006 | Palmon et al. |
| 2006/0071950 A1 | 4/2006 | Kurzweil et al. |
| 2006/0167857 A1 | 7/2006 | Kraft et al. |
| 2006/0167864 A1 | 7/2006 | Bailey et al. |
| 2006/0179051 A1 | 8/2006 | Whitney et al. |
| 2006/0218573 A1 | 9/2006 | Proebstel |
| 2006/0224552 A1 | 10/2006 | Riezler et al. |
| 2007/0005564 A1 | 1/2007 | Zehner |
| 2007/0067304 A1 | 3/2007 | Ives |
| 2007/0088603 A1 | 4/2007 | Jouppi et al. |
| 2007/0094247 A1 | 4/2007 | Chowdhury et al. |
| 2007/0112817 A1 | 5/2007 | Danninger |
| 2007/0130563 A1 | 6/2007 | Elgazzar et al. |
| 2007/0156677 A1 | 7/2007 | Szabo |
| 2007/0208719 A1 | 9/2007 | Tran |
| 2007/0226183 A1 | 9/2007 | Hart et al. |
| 2007/0261099 A1 | 11/2007 | Broussard et al. |
| 2007/0300258 A1 | 12/2007 | O'Connor et al. |
| 2008/0005118 A1 | 1/2008 | Shakib et al. |
| 2008/0155627 A1 | 6/2008 | O'Connor et al. |

OTHER PUBLICATIONS

Lee et al., How to Evaluate the Effectiveness of URL Normalizations, 2005.

Kim et al., Reliable Evaluations of URL Normalization, 2005.

Cholvi et al., Efficient search in unstructured peer-to-peer networks, Jul. 14, 2004, European Transactions on Telecommunications.

Adamic et al., "how to search a social network" social networks 27 (2005) 187-203, HP Labs, 1501 Page Mill Road, Palo Alto, CA 94304, USA www.esevier.com/locate/socnet © 2005 Elsevier B.V.

International Search Report issued in International Application No. PCT/US07/73999, dated Jul. 7, 2008, 8 pages.

Baker L. "Blinkx.TV: More Video Than Google Yahoo or YouTube" Search Engine Journal Jun. 14, 2006 pp. 1-7 http://www.searchenginjournal.com/blinkxtv-more-video-than-google-yahoo-or-myspace/3532/(Visited Mar. 5, 2008).

Agichtein et al., *Improving Web Search Ranking by Incorporating User Behavior Information*, SIGIR '06, Aug. 6-11, 2006. Seattle, Washington, USA Copyright 2006 ACM, pp. 19-26.

Joho et al., *Effectiveness of Additional Representations for the Search Result Presentation of the Web*, Joho, H. and Jose, J. M. (2005). A Comparative Study of the Effectiveness of Search Results Presentation on the Web. In: Lalmas, M., et al. (Eds.) Advances in Information Retrieval, 28th European Conference on Information Retrieval, pp. 302-313, L.

Lang, *A tolerance Rough Set Approach to Clustering Web Search Results* Institute of Mathematics Faculty of Mathematics, Informatics and Mechanics Warsaw University, Dec. 2003, pp. 1-77.

Fig. 8

STORING FINGERPRINTS OF MULTIMEDIA STREAMS FOR THE PRESENTATION OF SEARCH RESULTS

CROSS REFERENCE TO RELATED APPLICATIONS

This application is a continuation of U.S. application Ser. No. 11/589,991, filed on Oct. 31, 2006, now allowed, which claims the benefit of U.S. Provisional Application No. 60/820,013, filed Jul. 21, 2006, and U.S. Provisional Application No. 60/820,712, filed Jul. 28, 2006. Each of the above applications is incorporated herein by reference in its entirety.

TECHNICAL FIELD

The following description relates to electronic processing and presentation of search results.

BACKGROUND

Users seeking information can reference the Internet to find the information. To do so, the user enters a search query, which represents the information sought by the user, into a search engine and, in response, receives search results that are relevant to the search query. If the user seeks search results in a particular format, such as, for example, audio or video search results, a user can include one of the words "audio" or "video" in the search query along with words that relate to the content the user seeks.

SUMMARY

In a first general aspect, multimedia stream search results are made perceivable to a user. A multimedia search query is received from a user. The multimedia search query is compared with information related to known multimedia streams. Multimedia stream search results are determined based on the comparison. A popularity of the multimedia streams corresponding to the multimedia stream search results is determined based at least on a number of canonical URLs associated with the multimedia streams. A presentation of the multimedia stream search results to the user is configured based on the popularity of the corresponding multimedia streams.

With respect to at least the first general aspect, implementations may include one or more of the following features. For example, determining the popularity of the multimedia streams corresponding to the multimedia stream search results may include identifying hyperlinks for accessing the multimedia stream, resolving the identified hyperlinks to generate at least one canonical URL, determining a number of canonical URLs generated, and determining popularity of the multimedia stream based on the determined number of canonical URLs.

Web pages that include a hyperlink for accessing the multimedia stream may be identified. A popularity of the identified web pages may be determined. Popularity of the multimedia stream may be determined based on the determined popularity of the web pages.

Web pages that include a hyperlink for accessing the multimedia stream may be identified. A number of identified web pages may be determined. Popularity of the multimedia stream may be determined based on the determined number of identified web pages.

Content included within the multimedia stream may be identified. Popularity of the identified content may be determined. Popularity of the multimedia stream may be determined based on the determined popularity of the content.

Determining the popularity of one of the multimedia streams may include determining the popularity of a multimedia stream based on (1) a number of canonical URLs web pages that include hyperlinks for accessing the multimedia stream, (2) a popularity of a web page that includes a hyperlink for accessing the multimedia stream, (3) a number of web pages that include a hyperlink for accessing the multimedia stream, and/or (4) a popularity of content included within the multimedia stream.

Configuring the presentation of the multimedia stream search results to a user based on the popularity of the corresponding multimedia streams may include ranking or grouping the search results such that search results that are deemed to correspond to more popular multimedia streams are made perceivable closer to the top of a list of search results presented to the user than search results that are deemed to correspond to less popular multimedia streams.

In a second general aspect, popularity of a multimedia stream on the Internet is determined. A multimedia stream associated with a hyperlink is identified on the Internet. The multimedia stream has an essence that describes the content included within the multimedia stream. An essence fingerprint is created for the multimedia stream based on the essence. It is determined that the essence fingerprint has not already been stored in a video stream fingerprint database. The essence fingerprint is stored in the video stream fingerprint database. A canonical URL is created for the identified multimedia stream based on the detected hyperlink. The canonical URL is associated with the essence fingerprint. A canonical URL counter associated with the essence fingerprint is increased.

With respect to at least the second general aspect, implementations may include one or more of the following features. For example, popularity of the multimedia stream may be determined based on a value of the canonical URL counter associated with the essence fingerprint.

A number of web pages that include a hyperlink for accessing the multimedia stream associated with the essence fingerprint may be determined. A popularity of web pages that include a hyperlink for accessing the multimedia stream associated with the essence fingerprint may be determined. A popularity of the content associated with the multimedia stream associated with the essence fingerprint may be determined. A popularity of the multimedia stream may be determined based on the determined number of canonical URLs, the determined number of web pages, the determined popularity of web pages and/or the determined popularity of the content.

At least one of the determined number of canonical URLs, the determined number of web pages, the determined popularity of the web pages and the determined popularity of the content may be weighted prior to determining popularity of the multimedia stream.

The popularity of the multimedia stream may be stored in association with the essence fingerprint.

A multimedia search query may be received from a user. It may be determined that the multimedia stream is a match for the multimedia search query. The multimedia stream may be provided as a multimedia search result in a list of multimedia search results based on the determination. A popularity for the multimedia stream may be accessed based on the popularity stored in association with an essence fingerprint that is associated with the multimedia stream.

The multimedia stream may be organized among other matching multimedia streams in an interface based on a relative popularity of the multimedia stream and other multimedia streams.

Creating a canonical URL may include resolving at least one hyperlink to a simple URL format that includes a path and at least one of an IP address and a server name. Creating an essence fingerprint may include accessing a video stream that includes metadata bits and audio/video bits, removing the metadata bits from the video stream, and converting the remaining audio/video bits into a unique fingerprint that represents the audio/video bits. Converting the remaining audio/video bits into a unique fingerprint that represents the audio/video bits may include converting the remaining audio/video bits into a unique fingerprint that represents the audio/video bits using a hash code.

In a third general aspect, popularity of a multimedia stream on the Internet is determined. A multimedia stream associated with a hyperlink is identified on the Internet. T multimedia stream has an essence that describes the content included within the multimedia stream. An essence fingerprint is created for the multimedia stream based on the essence. It is determined that the essence fingerprint has already been stored in a video stream fingerprint database. At least one canonical URL is identified as being associated with the essence fingerprint. A canonical URL is created for the identified multimedia stream based on the detected hyperlink.

With respect to at least the third general aspect, implementations may include one or more of the following features. For example, it may be determined that the canonical URL is the same as one of the identified canonical URLs. The created canonical URL may be discarded.

It may be determined that the canonical URL is not the same as one of the identified canonical URLs. The created canonical URL may be associated with the essence fingerprint. A canonical URL counter associated with the essence fingerprint may be increased.

Popularity of the multimedia stream may be determined based on a value of the canonical URL counter associated with the essence fingerprint.

A number of web pages that include a hyperlink for accessing the multimedia stream associated with the essence fingerprint may be determined. A popularity of web pages that include a hyperlink for accessing the multimedia stream associated with the essence fingerprint may be determined. A popularity of the content associated with the multimedia stream associated with the essence fingerprint may be determined. A popularity of the multimedia stream may be determined based on the determined number of canonical URLs, the determined number of web pages, the determined popularity of web pages and/or the determined popularity of the content.

At least one of the determined number of canonical URLs, the determined number of web pages, the determined popularity of the web pages and the determined popularity of the content may be weighted prior to determining popularity of the multimedia stream.

The popularity of the multimedia stream may be stored in association with the essence fingerprint and the created canonical URLs.

A multimedia search query may be received from a user. It may be determined that the multimedia stream is a match for the multimedia search query. The multimedia stream may be provided as a multimedia search result in a list of multimedia search results based on the determination. A popularity for the multimedia stream may be accessed based on the popularity stored in association with an essence fingerprint that is associated with the multimedia stream. The multimedia stream may be organized among other matching multimedia streams in an interface based on a relative popularity of the multimedia stream and other multimedia streams.

Creating a canonical URL may include resolving at least one hyperlink to a simple URL format that includes a path and at least one of an IP address and a server name. Creating an essence fingerprint may include accessing a video stream that includes metadata bits and audio/video bits, removing the metadata bits from the video stream, and converting the remaining audio/video bits into a unique fingerprint that represents the audio/video bits. Converting the remaining audio/video bits into a unique fingerprint that represents the audio/video bits may include converting the remaining audio/video bits into a unique fingerprint that represents the audio/video bits using a hash code.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 8 is an illustration of an exemplary user interface (UI) for displaying search results corresponding to video streams that satisfy a video search query.

DETAILED DESCRIPTION

Figure 1:
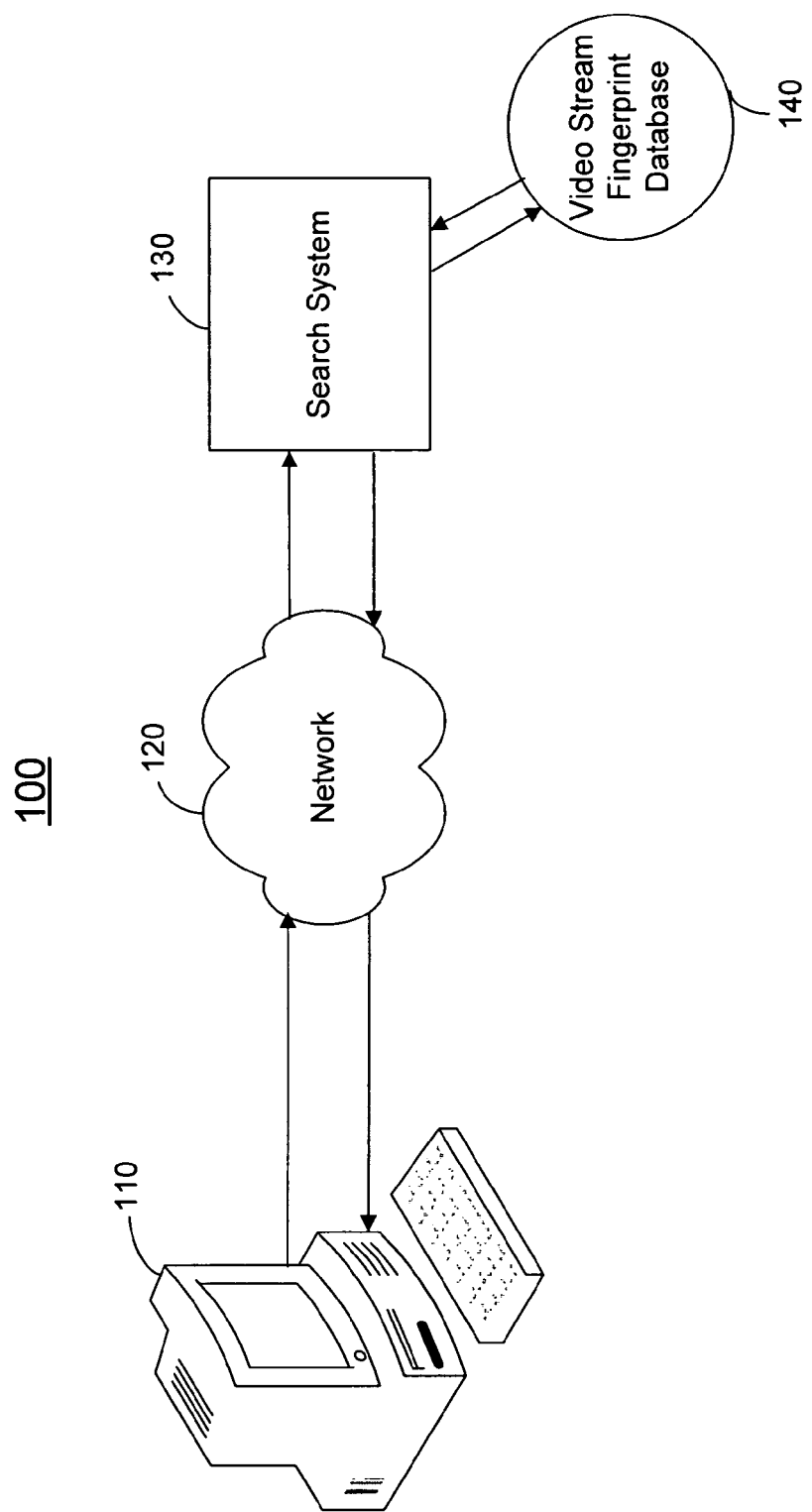
FIG. 1 is an illustration of an exemplary communications system for providing electronic search results that correspond to video streams through a network to a client.

An electronic search system receives a search query from a user and processes the search query to identify a group of electronic search results that satisfy, or are responsive to, the search query. The electronic search system enables the user who provided the search query to access or perceive the group of search results. Each of the electronic search results typically includes a hyperlink (also referred to as a link) or pointer that is selectable by the user to access a content item that is deemed by the electronic search system to satisfy the information need represented by the search query. The content item may be, for example, an electronic document (e.g., a web page or a .pdf document), an audio stream, or a video stream. Selection by a user of a search result corresponding to a particular stream may cause initiation of the streaming of content corresponding to the particular stream.

One way of presenting electronic search results to a user is to display the electronic search results in a ranked or grouped list. The rank (or grouping) of each search result in the list may be determined based on a popularity of the content item associated with the search result. Search results corresponding to content items that are deemed more popular may be considered more relevant and, therefore, ranked higher than search results corresponding to content items that are deemed less popular. Mechanisms for measuring the popularity of a video stream or an audio stream are described. The measured popularity of the video or audio stream may then be used to modify the presentation to a user of search results associated with the video or audio stream.

A multimedia (e.g., video and/or audio) stream, unlike a typical web page, is a content item that is often not uniquely identified by a single uniform resource locator (URL). Rather, the same multimedia stream may be stored in files at multiple different locations having entirely different names and corresponding to entirely different URLs. Accordingly, many different links (e.g., selectable hyperlinks that will cause initiation of the streaming of video or audio) may reference the exact same multimedia stream, or video or audio streams deemed to have common characteristics.

Determining the popularity of a multimedia stream, therefore, may involve identifying a particular stream based on its essence (e.g., encoded bits that represent the multimedia content), and either or both of tracking a number of links pointing to the particular multimedia stream and determining the popularity of web pages that include a link to the particular multimedia stream. Other information can also be used to determine stream popularity, such as, for example, popularity of content associated with the multimedia stream. For example, if a video stream relates to a particular celebrity, the popularity of the celebrity may impact the popularity of the multimedia stream.

Accordingly, these factors of popularity may be optionally weighted, and used in combination with one another to estimate a popularity measure for a particular multimedia stream. The popularity measure then may be used to group or rank search results corresponding to particular multimedia streams. In some implementations, a search result corresponding to a particular stream is a search result having a link or pointer that is selectable by a user to initiate the streaming of the content corresponding to the particular stream.

Moreover, techniques are provided for determining a popularity measure for a multimedia stream and subsequently using the popularity measure to modify the presentation of an electronic search result corresponding to the multimedia stream in a group of search results generated in response to a search query. The same techniques also may be used for determining a popularity measure for a video and/or an audio stream and using the popularity measure to modify the presentation of an electronic search result corresponding to the video stream and/or audio stream in a group of search results.

The communications system 100 of FIG. 1 includes a search system 130 for providing electronic search results, including electronic search results that correspond to video streams, through a network 120 to a client 110. The client 110 may receive a video search query from a user. The client 110 may provide the video search query to the search system 130 through the network 120. In response, the search system 130 may determine search results corresponding to video streams that best satisfy the video search query and provide the search results to the client 110 through the network 120.

Each of the client 110 and the search system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and search system 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the search system 130.

The client 110 may include one or more devices capable of accessing content on the search system 130. The search system 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The network 120 includes hardware and/or software capable of enabling direct or indirect communications between the client 110 and the search system130. As such, the network 120 may include a direct link between the client 110 and the search system130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The search system 130 may include a general-purpose computer having a central processor unit (CPU), and memory/storage devices that store data and various programs such as an operating system and one or more application programs. Other examples of a search system 130 includes a workstation, a server, a special purpose device or component, a broadcast system, other equipment, or some combination thereof capable of responding to and executing instructions in a defined manner. The search system 130 also may include an input/output (I/O) device (e.g., video and audio input and conversion capability), and peripheral equipment such as a communications card or device (e.g., a modem or a network adapter) for exchanging data with the network 120.

The search system 130 is generally capable of executing instructions under the command of a controller (not separately shown). The search system 130 may be used to provide content to the client 110. The controller may be implemented by a software application loaded on the search system 130 for commanding and directing communications exchanged with the client 110. Other examples of the controller include a program, a piece of code, an instruction, a device, a computer, a computer system, or a combination thereof, for independently or collectively instructing the client 110 or the search system 130 to interact and operate as described. The search system 130 may be embodied permanently or temporarily in any type of machine, component, physical or virtual equipment, storage medium, or propagated signal capable of providing instructions to the client 110 or the search system 130.

More particularly, the search system 130 may provide search results that do not include any duplicates, such as, for example, two search results that correspond to the same video stream. Moreover, the search system 130 may present the search results such that search results corresponding to more popular video streams are more prominently presented than search results corresponding to less popular video streams. For example, search results corresponding to more popular video streams may be more prominently presented by being raised in position or in rank (e.g., boosted) to the top of a displayed search result list.

The search system 130 may be configured to determine the popularity of video streams and eliminate duplicate video stream search results by leveraging a video stream fingerprint database 140. The video stream fingerprint database 140 includes-canonical uniform resource locators (URLs) and associated essence fingerprints. An essence fingerprint is a parameter or a group of parameters that describes the content of, and metadata for, a particular video stream. A canonical URL is a URL in its simplest form, such that several URLs that look different, but refer to the same copy of a content item (e.g., a video stream) may be resolved into a single canonical URL.

A single essence fingerprint may be associated with multiple canonical URLs if more than one copy of a video stream associated with the essence fingerprint exists on the Internet. More particularly, a single canonical URL may exist for multiple links that each refer to a copy of a particular video stream (having the same essence fingerprint) on the Internet. As such, the single essence fingerprint may be associated with multiple canonical URLs. In general, the more canonical URLs associated with a particular essence fingerprint, the more popular the video stream associated with the particular essence fingerprint. Furthermore, by indexing the links or URLs that reference individual video streams, duplicate video streams may be dropped from a group or list of search results.

Figure 2:
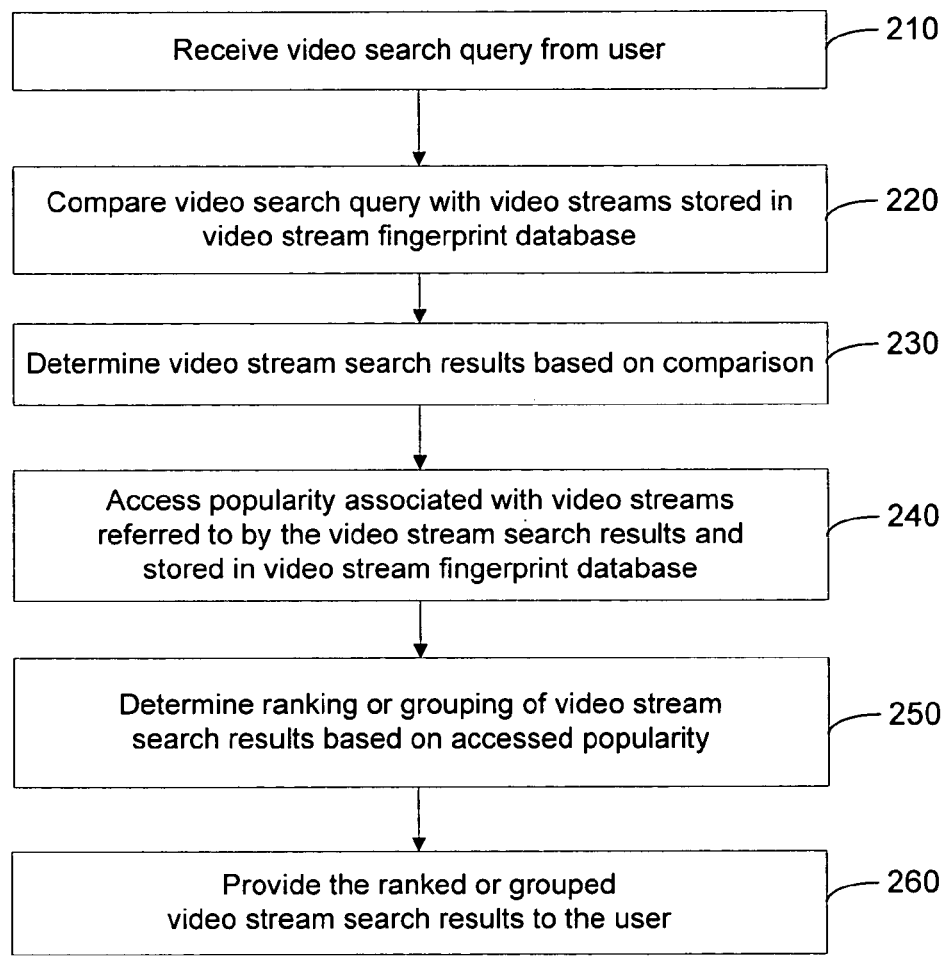
FIG. 2 is a flow chart of an exemplary process for determining and providing ranked or grouped video stream search results to a user.

Process 200 of FIG. 2 is configured to determine and provide ranked video stream search results to a user. Generally, the operations of process 200 may be performed by a search system, such as, for example, the search system 130 of FIG. 1. For convenience, the process 200 is therefore referenced as being performed by the search system 130. However, similar methodologies may be applied in other implementations where different components are used to define the structure of the system 100 of FIG. 1, or where the functionality is distributed differently among the components shown in FIG. 1.

The search system 130 receives a video search query from a user (210). In one example, the video search query may be a keyword query, where the keyword resolves to a predetermined result (e.g., the keyword "penguin" always resolves to a video clip from the movie "March of the Penguins"). In another example, the video search query may be a non-keyword query, such that many search results may be provided in response to the video search query, and the provided search results may not have been determined prior to execution of this particular search (e.g., the non-keyword query "penguins" may resolve to a video clip from the movie "March of the Penguins," a poster store selling penguin posters and an article about penguin habitats). Stated differently, a non-keyword query may resolve to a different set of search results each time a search for the non-keyword query is performed (e.g., the non-keyword query "penguins" may resolve to, inter alia, a video clip from the movie "March of the Penguins" today, and tomorrow, the same non-keyword query may resolve to a video clip from the new movie "March of the Penguins 2: The March Continues"). In either case, and in one implementation, the video search query may be a textual (or non-textual, e.g., video or audio) input submitted by a user using an input device (e.g., a keyboard, mouse, stylus, touch screen, microphone or camera).

The video search query received from the user may be identified by the search system 130 as a video search query based on, for example, the user's prior selection of a specialty video search engine, an indication provided with the video search query (e.g., a video search query input of "penguin" and the indication "video") and/or a determination by the search system 130 that a video stream may best satisfy the video search query (e.g., a video search result may be determined to be the most satisfactory search result type for a video search query related to a television show or movie). In another implementation, the search system 130 provides both non-video-related search results and video-related search results together in response to the same video search query.

Figure 4A:
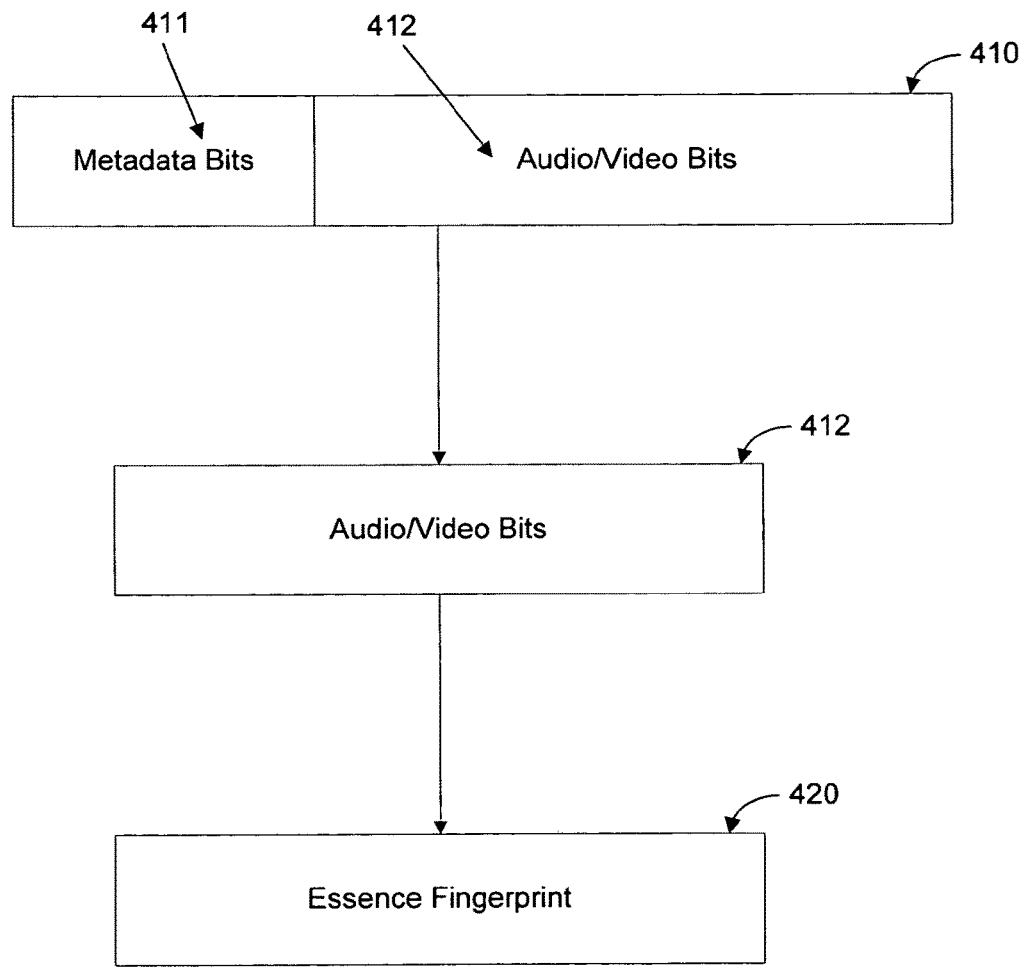
FIG. 4A is a block diagram illustrating creation of an essence fingerprint for a video stream.
Figure 4B:
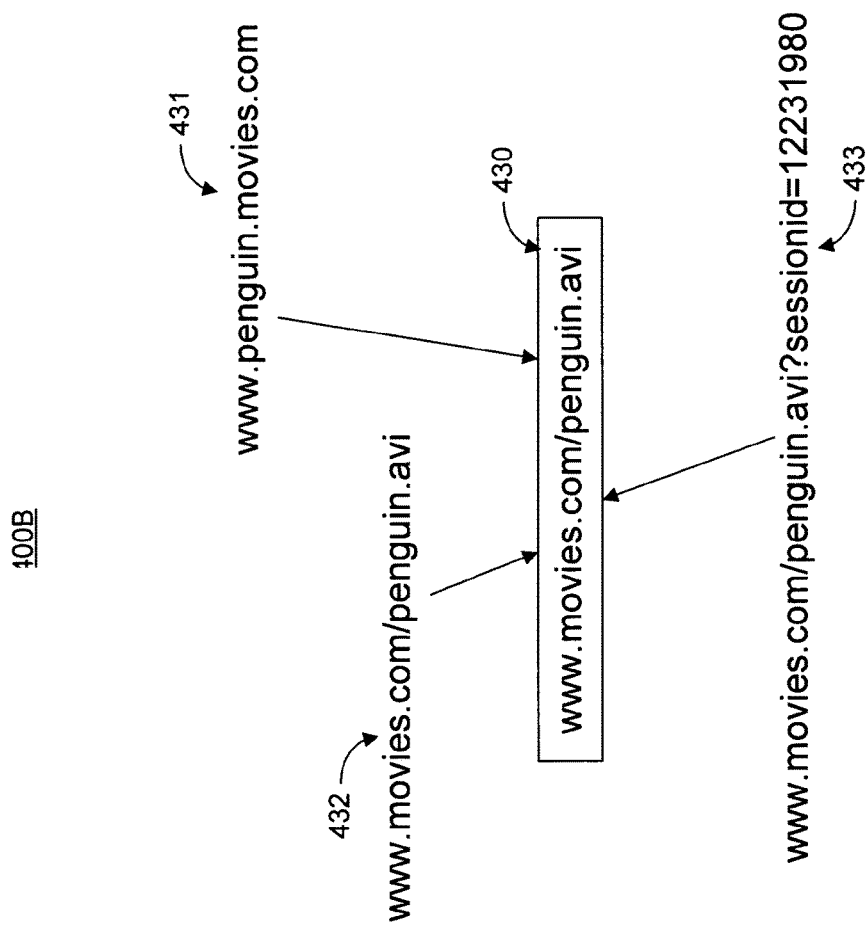
FIG. 4B is a block diagram illustrating creation of a canonical URL from several URLs that each references the same copy a video stream.

The search system 130 compares the video search query with video streams stored in the video stream fingerprint database 140 (220). In one implementation, information related to the video search query may be compared against information associated with a video stream. Information related to the video search query may include, for example, terms and phrases included in the video search query (e.g., "penguin"), a category associated with the video search query and determined by reference to an ontology (e.g., "animals," "nature" or "movies"), or other contextual clues (e.g., a user profile or a user's recent searching or browsing activity). Information associated with a video stream, which may be stored in the video stream fingerprint database 140, may include an essence fingerprint for the video stream (an example of which is shown in FIG. 4B), at least one canonical URL for the video stream (an example of which is shown in FIG. 4A) and an indication of popularity of the video stream.

Based on the comparison, the search system 130 determines video stream search results that satisfy the video search query (230). If there is a correlation between information related to the video search query and information associated with a video stream, the video stream may be identified as a search result that satisfies the video search query. For example, for the video search query "penguin," a video stream that includes information related to "penguins," such as, for example, a video stream of a movie entitled "March of the Penguins," where the title resides in metadata associated with the video stream, may be identified as a search result that satisfies the video search query.

The search system 130 accesses a popularity associated with video streams referred to by the video stream search results (240). The popularity measure for a particular video stream may be determined and stored in the video stream fingerprint database 140 of FIG. 1. The popularity of a video stream may be determined based on a number of canonical URLs associated with the video stream, a popularity of a web page that includes a URL that references the video stream and/or popularity of the subject matter of, or content contained within, the video stream itself. The popularity of a particular video stream may be determined using, for example, process 700 of FIG. 7.

The search system 130 then determines a rank or grouping for each video stream search result based on the popularity of the corresponding video stream (250). For example, if a first video stream is deemed more popular than a second video stream, a search result corresponding to the first video stream may be ranked or positioned higher than a search result corresponding to the second video stream in a search result list. The search system 130 enables perception of the ranked or grouped video stream search results by the user typically by providing the ranked or grouped search results to the client system 110, which displays the search results to the user (260).

Figure 3A:
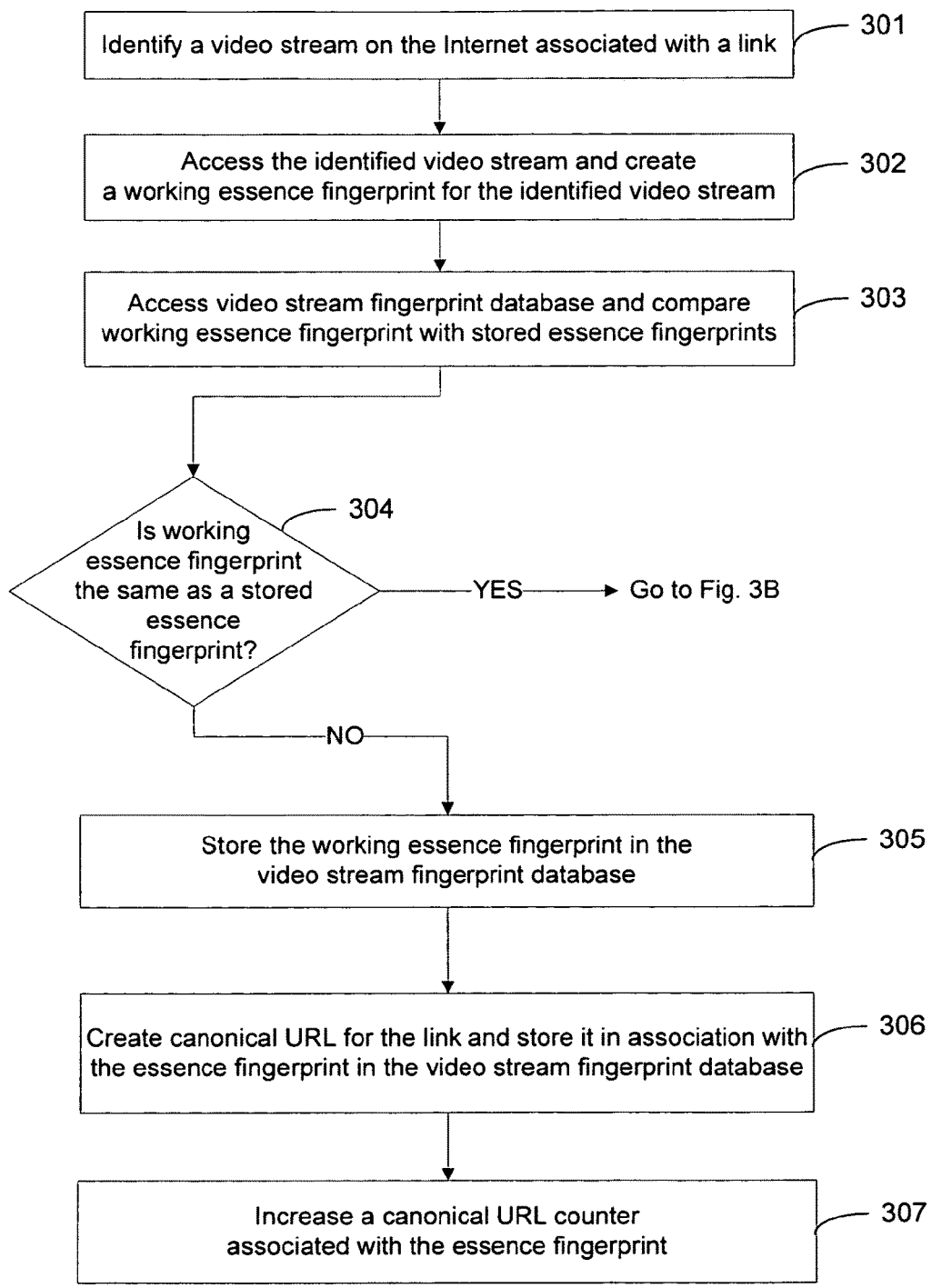
FIGS. 3A and 3B are a flow chart of an exemplary process for determining a number of canonical uniform resource locators (URLs) associated with an essence fingerprint for a particular video stream.
Figure 3B:
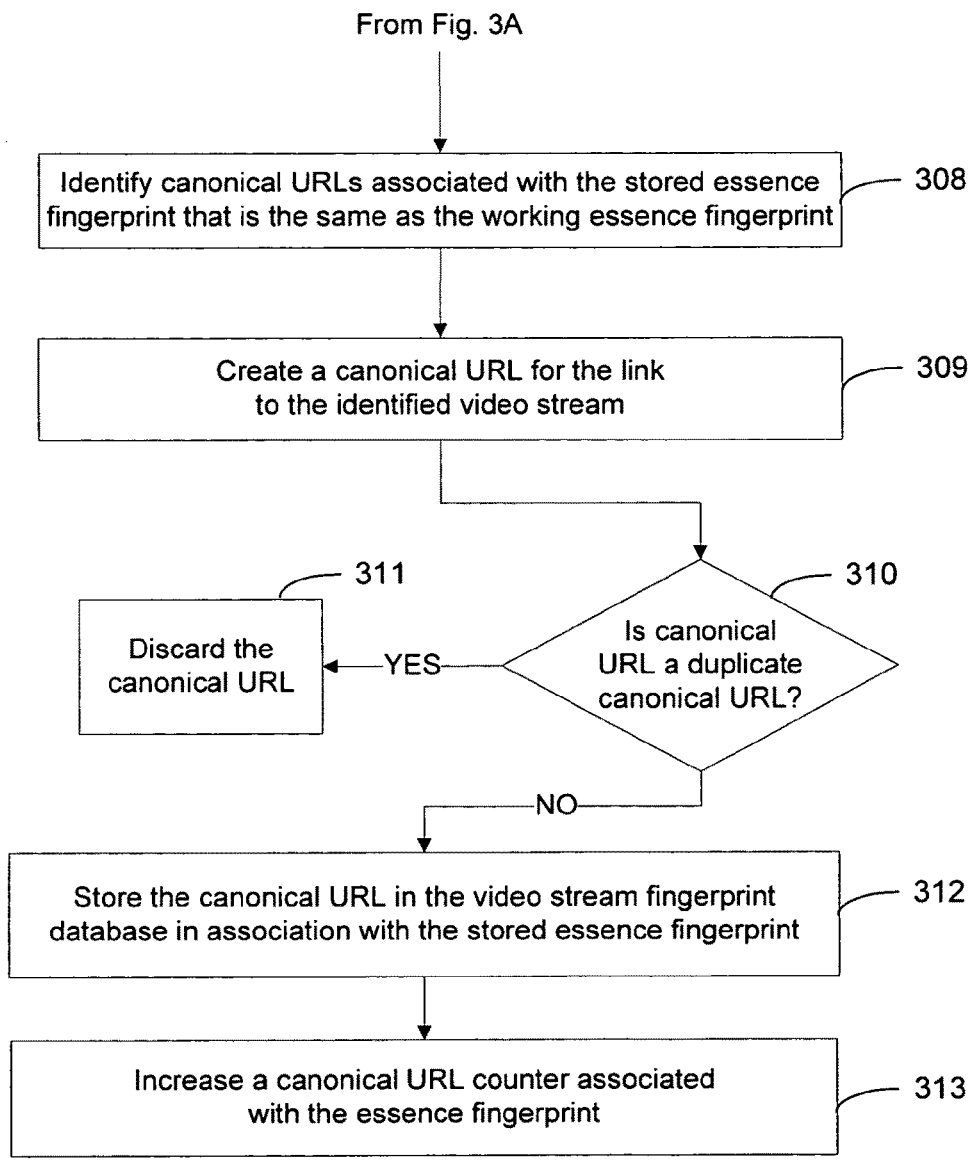

Process 300 of FIGS. 3A and 3B is configured to identify a video stream on the Internet, generate an essence fingerprint for the identified video stream and determine a number of canonical URLs associated with the essence fingerprint. The number of canonical URLs may be used directly as a measure of the popularity of the identified video stream or, alternatively, may be combined with one or more other factors (described in more detail below) to estimate the popularity of the identified video stream. The popularity of the video stream then may be stored in association therewith within the video stream fingerprint database 140. And, as described in operation 250 of process 200, the popularity of a particular video stream may be subsequently used to determine a ranking or grouping of a search result corresponding to the particular video stream in a list of electronic search results identified in response to a video search query.

Generally, the operations of process 300 may be performed by a search system, such as, for example, the search system 130 of FIG. 1. For convenience, the process 300 is therefore referenced as being performed by the search system 130. However, similar methodologies may be applied in other implementations where different components are used to define the structure of the system 100 of FIG. 1, or where the functionality is distributed differently among the components shown in FIG. 1.

The search system 130 identifies a video stream on the Internet, where the video stream is associated with a link (or URL) (301). In one implementation, the search system 130 may search, or crawl, the Internet seeking web pages that include selectable hyperlinks or URLs that likely reference a video (or audio) stream. For example, hyperlinks that likely reference video streams may include particular extensions, such as, for example, .wmv, .mov, .mp4, .swf and .flv. When the search system 130 identifies such a hyperlink on the Internet, the search system 130 may identify the hyperlink as a link to a video stream. For example, the search system 130 identifies the link www.penguin.movies.com as the link associated with the identified video stream.

In some implementations, rather than cold crawling the Internet to identify a video stream associated with a link, the search system 130 may only crawl or search web pages that have already been identified as being likely to include URLs that reference a video stream. Techniques for doing so are described in more detail below with respect to process 700 of FIG. 7.

After identifying a video stream, the search system 130 accesses the identified video stream (via the link) and creates a working essence fingerprint for the identified video stream (302) Block diagram 400A of FIG. 4A illustrates creation of an essence fingerprint for a video stream. The search system 130 accesses the identified video stream 410. The identified video stream 410 includes metadata bits 411 and audio/video bits 412. The metadata bits 411 include information related to the video stream, such as, for example, (1) a stream ID that identifies the video stream, (2) a title for the video stream that may be determined from, for example, the file name of the video stream, data included in a link that refers to the video stream, title information provided by a user, or from speech-to-text analysis of audio in the video stream (e.g., "March of the Penguins"), (3) a date on which the video stream was published to the Internet (e.g., Oct. 11, 2006), (4) a format associated with the video stream (e.g., .wmv, .mov, .mp4, .swf and .flv), (5) a duration of the video stream (e.g., 15 minutes), (6) a file size associated with the video stream (e.g., 12 Mbytes), (6) a bit rate that may be achieved when streaming the video stream (e.g., 34 Kbps) and, (7) any keywords associated with the video stream (e.g., words that summarize, or are included in, the content of the video stream, as determined by a user or automatically via, for example, speech-to-text analysis). The audio/video bits 412 include the information that makes up the actual audio and video information associated with the stream. Stated differently, the audio/video bits 412 are the bits that include the information that enables content of the video stream to be presented to a user in a manner such that the user can perceive the audio/video content.

To create an essence fingerprint, as shown in block diagram 400A, the metadata bits 411 may be stripped from the video stream 410. The audio/video bits 412 are then fingerprinted using, for example, a hash coding compression algorithm, such as, MD5, to create an essence fingerprint 420 for the video stream 410. The essence fingerprint 420 is a set of bits that uniquely represents the audio/video bits 412 of the video stream 410. As such, two video streams that include identical audio/video bits will have the same essence fingerprint. Thus, essence fingerprints of two video streams may be used to determine if the two video streams are identical (e.g., if the two video streams have the same essence).

Once the working essence fingerprint has been created for the identified video stream, the search system 130 accesses the video stream fingerprint database 140 and compares the working essence fingerprint with the stored essence fingerprints (303). As mentioned above, because an essence fingerprint is a unique identifier associated with a video stream, if the video stream identified in operation 301 has already been identified and stored in video the stream fingerprint database 140, the working essence fingerprint for the identified video stream may already be stored in the video stream fingerprint database 140.

The search system 130 determines if the working essence fingerprint is the same as a stored essence fingerprint (304). If the working essence fingerprint is not the same as a stored essence fingerprint, then information related to the identified video stream has not already been stored in the video stream fingerprint database 140. As such, the search system 130 stores the working essence fingerprint in the video stream fingerprint database 140 (305).

The search system 130 creates a canonical URL for the link and stores it in association with the essence fingerprint previously stored in the video stream fingerprint database 140 in operation 305 (306). Block diagram 400B of FIG. 4B illustrates creation of a canonical URL for multiple hyperlinks (or URLs); however, the same process may be used when a canonical URL is being created from a single hyperlink (or URL) (e.g., www.penguin.movies.com) as contemplated by operation 306.

More particularly, block diagram 400B illustrates resolution of multiple hyperlinks (or URLs) that refer to a single copy of a video stream on the Internet into a single canonical URL. Hyperlink 431 www.penguin.movies.com, hyperlink 432 www.movies.com/penguin.avi, and hyperlink 433 www.movies.com/penguin.avi?sessionid=12231980, each refer to a video stream stored on a movies.com server and having a file name of penguin.avi. Hyperlink 431 and hyperlink 432 represent two different formats for referring to the same location on the Internet, and hyperlink 433, which includes the same format as hyperlink 432, also includes additional information related to a session identifier that indicates a particular session during which a user accessed the video stream via the hyperlink 433.

To create a canonical URL for several hyperlinks (or URLs) that refer to the same location on the Internet, which may be referred to as canonicalization, extraneous information (e.g., session IDs) may be removed from the hyperlinks. In addition, hyperlinks having different formats may be standardized to a single, predetermined format. In the example shown in block diagram 400B, the format that includes a server name and a path (e.g., "server name/path") has been selected as the format for the canonical URL, however, a format of "path.server name," or some other pre-selected format also may be used. As such, the hyperlinks 431, 432, and 433 may be canonicalized to create canonical URL 430 of www.movies.com/penguin.avi.

The search system 130 stores the canonical URL (e.g., www.movies.com/penguin.avi) in the video stream fingerprint database in association with the stored working essence fingerprint using, for example, a pointer, a table or other method to ensure that the canonical URL and the essence fingerprint are associated with one another.

The search system 130 increases a canonical URL counter associated with the essence fingerprint (307). Because the essence fingerprint for the video stream identified in operation 301 was not already stored in the video stream fingerprint database, only one canonical URL (e.g., the canonical URL created in operation 306) is known to be associated with the essence fingerprint. As such, the canonical URL counter may be set to a value of 1. The value of the canonical URL counter associated with the essence fingerprint also may be stored in the video stream fingerprint database 140 in association with the essence fingerprint.

Returning to operation 304, if the working essence fingerprint is the same as a stored essence fingerprint, then it may be determined that information related to the identified video stream has already been stored in the video stream fingerprint database 140. As such, there is no need to store the working essence fingerprint in the video stream fingerprint database 140. Rather, the search system 130 identifies canonical URLs that have already been stored in association with the stored essence fingerprint that is the same as the working essence fingerprint (308).

The search system 130 creates a canonical URL for the link to the identified video stream (309), as described above with respect to operation 306. The search system 130 compares the canonical URL created in operation 309 with the stored canonical URLs (as identified in operation 308) to determine if the canonical URL is a duplicate canonical URL (310). If the created canonical URL is the same as a stored canonical URL, then the created canonical URL is a duplicate canonical URL and the search system discards the canonical URL (311). Duplicate canonical URLs may be discarded by the search system 130 to ensure that the same reference to a particular video stream (e.g., the same copy of a video stream on the Internet) is not counted twice in determining the number of references to, and copies of, the video stream that exist on the Internet.

If the created canonical URL is not the same as a stored canonical URL, the search system 130 stores the created canonical URL in the video stream fingerprint database 140 in association with the stored essence fingerprint (312). The search system 130 also increases a canonical URL counter associated with the stored essence fingerprint (313).

In general, the canonical URL counter is increased each time a link to a detected video stream, which has the same essence fingerprint as the identified video stream, is encountered, and the canonical URL for the link has not already been associated with (and counted for) the essence fingerprint. More precisely, N copies of a particular video stream (e.g., N video streams that have the same essence fingerprint) may exist on the Internet. Each of the N copies of the video stream may exist in a particular location (e.g., having a server name and a path). Multiple URLs (or links) may refer to each of the N copies of the video stream at the N locations. However, only a single canonical URL may be created (e.g., by resolving the multiple links into the canonical URL) for each of the N copies of the video stream, such that one canonical URL may be associated with each of the N locations at which the video stream copies are stored. As such, by taking into account a number of canonical URLs associated with a particular essence fingerprint, the canonical URL counter may be used to indicate a number of copies of a particular video stream on the Internet.

In some implementations, and as described below, a number of real links (or URLs) to a particular video stream also may be counted to determine popularity for the particular video stream. A real link represents a single reference to a copy of a video stream on the Internet. As such, counting real links may result in counting the same copy of the particular video stream multiple times, whereas counting canonical URLs, which have already taken into account, and removed, duplicate links and links that have different formats, but refer to the same copy of a video stream (e.g., the same location), results in counting each copy of the particular video stream only once. If only real links were counted as a measure of popularity of a video stream, a user could "spam," or falsely inflate, the popularity value by creating a large number of links (by embedding such links in one or more web pages) to a single copy of the video stream.

Figure 5:
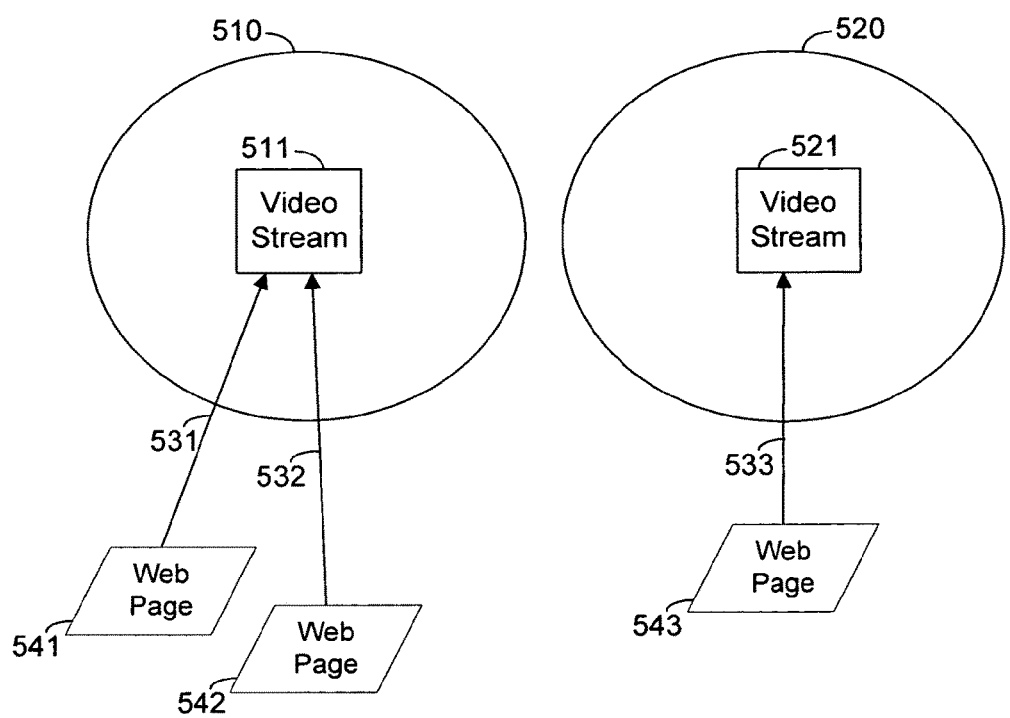
FIG. 5 is a block diagram illustrating two copies of a single video stream each being located at a server and being referenced by at least one URL.

Block diagram 500 of FIG. 5 illustrates two copies of a single video stream each being located at a server and being referenced by at least one URL. More particularly, two copies of a single video stream (e.g., two video streams having the same essence fingerprint)—copy 511 and copy 521—are stored at two different locations on the Internet. Copy 511 is stored on server 510 and copy 521 is stored on server 520.

Each of the copies 511 and 521 are referenced by at least one URL (or link) that exists on one of web pages 541, 542, and 543. More particularly, URLs 531 and 532 point to copy 511 on server 510 and URL 533 points to copy 521 on server 520. For example, web page 541 may be entitled "All Movies, All the Time," and may include a link 531 to copy

511 of www.server510.com/videostream, while web page 542 may be entitled "Penguins On TV," and may also include a link 532 to copy 511, but the link may be formatted as www.videostream.server510.com. Moreover, web page 543 may be entitled "Movies, Movies, and More Movies," and may include a link 533 to copy 521 of www.server520.com/videostream?sessionID=101.

Because the links 531 and 532 refer to the same copy of the video stream at the same location (e.g., copy 511 on server 510), the two links 531 and 532 may be canonicalized to create a single canonical URL that represents both links, such as, for example, the canonical URL www.server510.com/videostream. Link 533 also may be resolved into a canonical URL, such as, for example, the canonical URL www.server520.com/videostream.

As such, an essence fingerprint for the video stream may be stored in the video stream fingerprint database 140 and may be associated with the two canonical URLs: www.server510.com/videostream and www.server520.com/videostream. Thus, a canonical URL counter for the essence fingerprint may have a value of 2. However, and as described above, a number of real URLs associated with the essence fingerprint also may be determined. Because 3 links actually refer to video streams on the web (e.g., copies 511 and 521) having the same essence fingerprint, the number of real URLs associated with the essence fingerprint may be 3.

Figure 6:
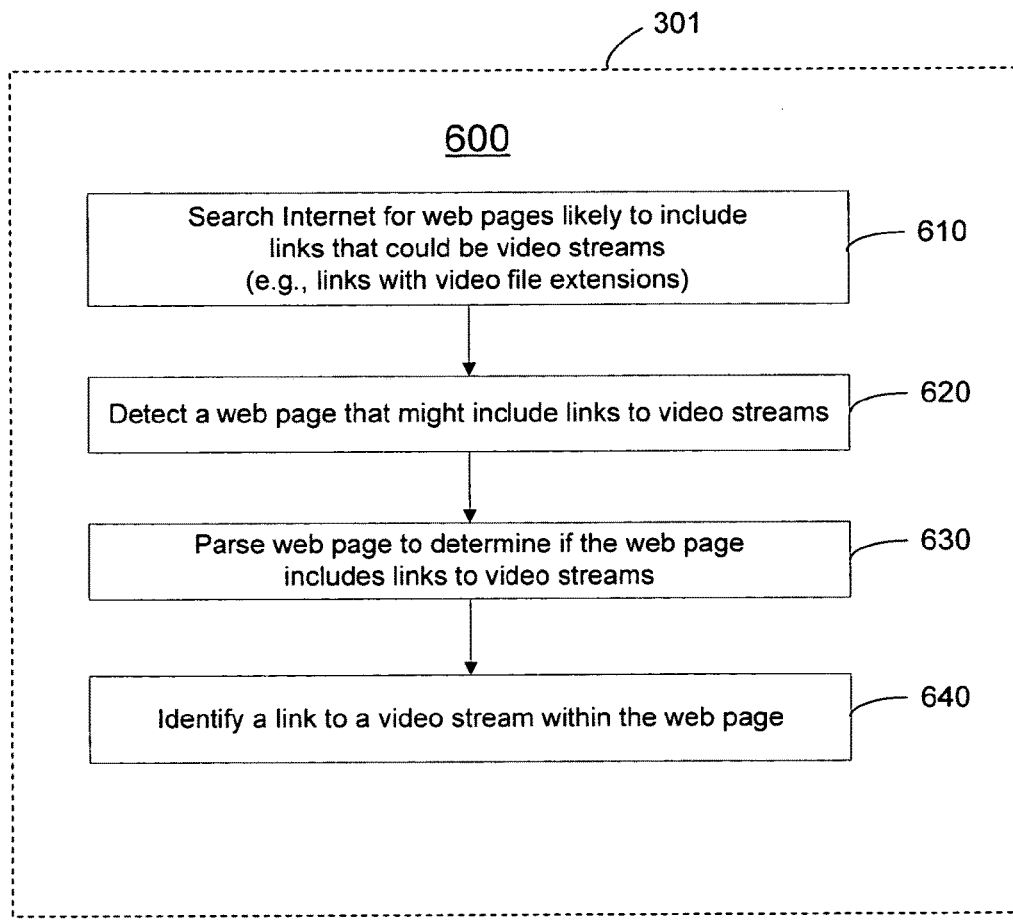
FIG. 6 is a flow chart of an exemplary process for detecting links to video streams on the Internet.

Process 600 of FIG. 6 is configured to detect links to video streams on the Internet. More particularly, process 600 is one implementation of operation 301 of FIG. 3.

Generally, the operations of process 600 may be performed by a search system, such as, for example, the search system 130 of FIG. 1. For convenience, the process 600 is therefore referenced as being performed by the search system 130. However, similar methodologies may be applied in other implementations where different components are used to define the structure of the system 100 of FIG. 1, or where the functionality is distributed differently among the components shown in FIG. 1.

The search system 130 searches or crawls the Internet for web pages likely to include links that could be video streams, such as, for example, links that include video file extensions (e.g., .wmv) (610).

The search system 130 detects a web page that is likely to include links to video streams (620). In some implementations, the search system 130 may be seeded with information that may help the search system determine whether a web page is likely to include links to video streams. For example, the search system may be seeded with known video file extensions (e.g., .wmv), words and phrases related to video stream links (e.g., "click here to view the full video," "click here to begin streaming," "stream," "video," "play" or "volume") and a list of web pages that are known to include links to video streams. The search system then searches the Internet for web pages that (1) include a link having one of the known video file extensions, (2) include one of the video stream link words or phrases, or (3) is a web page that has already been determined by the search system to include links to video streams. For example, the search system 130 may detect a web page that includes the phrase "click here to view the full video" and thus may determine the web page to be one that is likely to include a link to a video stream. For example, the search system 130 detects a web page entitled "All Videos, All the Time." The search system 130 parses the detected web page to determine if the web page actually includes any links to video streams (630). For example, the search system reviews the source of the detected web page (e.g., hypertext markup language (HTML), extensible markup language (XML) or other tags and code associated with the web page) to identify URLs that are links to video streams. As described above, links to video streams may include particular characteristics, such as, for example, particular extensions (e.g., .wmv) or domain names (e.g., movies.com) that are known to relate to video streams. Based on this criteria, the search system may detect zero, one or more than one links to video streams in the detected web page.

Based on the parsing, the search system 130 identifies a link to a video stream within the web page (640). For example, the search system identifies the link www.snakes.com/video.wmv on the web page "All Videos, All the Time," which references a video about caring for snakes as pets. The identified video stream and corresponding link then may be used during process 300 to determine a number of canonical URLs that are associated with video streams having the same essence (e.g., content) as the snakes-as-pets video associated with the link www.snakes.com/video.wmv.

Figure 7:
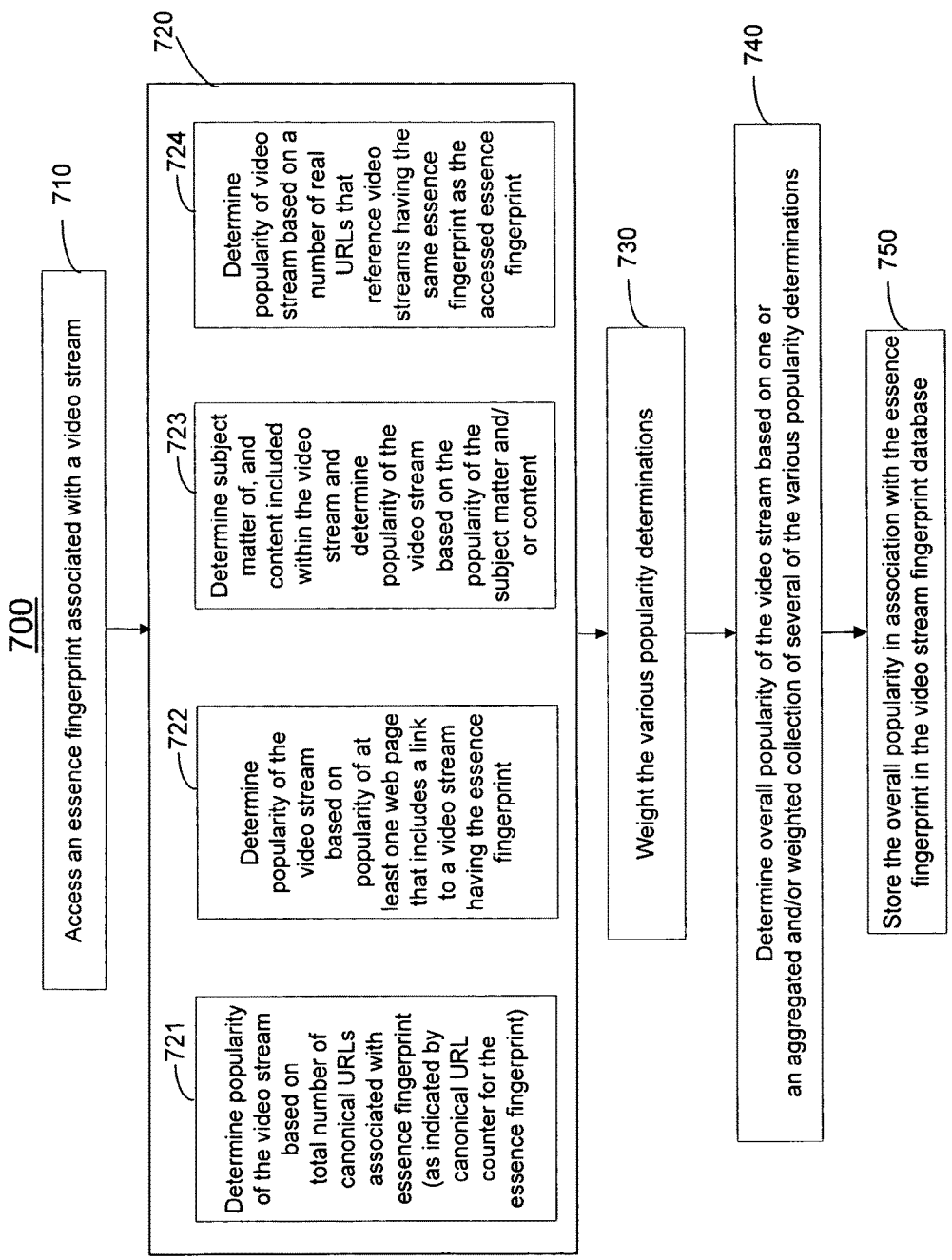
FIG. 7 is a flow chart of an exemplary process for determining popularity of a video stream on the Internet.

Process 700 of FIG. 7 is configured to determine popularity of a video stream on the Internet. Generally, the operations of process 700 may be performed by a search system, such as, for example, the search system 130 of FIG. 1. For convenience, the process 700 is therefore referenced as being performed by the search system 130. However, similar methodologies may be applied in other implementations where different components are used to define the structure of the system 100 of FIG. 1, or where the functionality is distributed differently among the components shown in FIG. 1.

The search system 130 accesses an essence fingerprint associated with a video stream (710). In one implementation, the search system 130 may have already accessed a video stream (e.g., a video stream associated with a particular search result provided in response to a video search query), and thus, the search system 130 may access video stream fingerprint database 140 to receive the essence fingerprint associated with the video stream. In other implementations, the search system 130 may access video stream fingerprint database 140 and select an essence fingerprint at random to determine a popularity of the associated video stream.

The search system 130 may determine the popularity of the video stream in a variety of different ways (720). First, the search system 130 may determine the popularity of the video stream based on a total number of canonical URLs associated with the essence fingerprint of the video stream (721). The total number of canonical URLs associated with the essence fingerprint may be determined based on the canonical URL counter for the essence fingerprint, as described above.

Second, the search system 130 may determine the popularity of the video stream based on a popularity of at least one web page that includes a link to a video stream having the essence fingerprint as the video stream (722). The popularity of a web page may be determined based on a number of times the web page is visited (i.e., web page "hits") during a certain time period, such as, for example, a day, a number of other web pages that include links to the web page or a number of times the web page is returned as a search result. For example, a web page entitled "Karl's Music Video Web Page" includes a link to a video stream for a music video for the song "Rio" by the band Duran Duran. The link may be represented by the URL www.karl.com/musicvideo.wmv. A popularity for Karl's Music Video Web Page may be determined based on an indication that the web page has been visited 50 times in a given day. This indication may represent that web page has a popularity value of, for example, 50 out of a possible 100. As such, the popularity of the video stream associated with the music video for the song "Rio" by the band Duran Duran may be determined based on the popularity value (e.g., 50/100) associated with the web page in which a link to the video stream is included.

Third, the search system 130 may determine the subject matter of, and content included in, the video stream and may determine the popularity of the video stream based on the popularity of the subject matter and content (723). The content of a video stream may be determined based on information related to the video stream, such as, for example, a title associated with the file in which the video stream is stored, metadata, a category or topic associated with the video stream or via speech-to-text conversion of the stream, itself. For example, the search system 130 may determine that a particular video stream includes a music video for the song "Rio" by the band Duran Duran. As such, the search system 130 may further determine that the video stream belongs to a music category, a music video category and/or an entertainment category, is related to the band Duran Duran and the song "Rio." As such, the search system 130 may determine the popularity of the video stream based on, for example, a popularity associated with a category (e.g., music) or other information (e.g., the name of a song embodied within the video stream), such that the popularity of the content of the video stream acts as a surrogate for the popularity of the video stream itself.

In the present example, the band Duran Duran may be determined to be more popular than the band Men At Work. The popularity of the bands may be determined based on, for example, a number of search queries related to the band, a popularity of web pages that include content related to the band and/or a number of times the band's name appears in entertainment or gossip documents. As such, the popularity of the video stream for the Duran Duran music video may be determined to be more popular than a video stream for a music video by the band Men At Work.

Fourth, the search system 130 may determine popularity of the video stream based on a number of real URLs that reference video streams having the same essence fingerprint as the accessed essence fingerprint (724). As described above, instead of counting a number of canonical URLs associated with a particular essence fingerprint (e.g., counting a number of copies of a video stream having the essence fingerprint on the Internet), the search system 130 may determine a number of real links (or URLs) that reference one or more copies of the video stream on the Internet. As such, duplicates URLs may be taken into account in operation 724 based on the assumption that a video stream that is more popular than other video streams may include both a larger number of copies of the video stream on the Internet, and a larger number of real links to each of those copies on the Internet, than the number of copies of, and links to, a less popular video stream.

The various popularity measures 721-724 may be used individually as a popularity measure, or all or some may be weighted and combined to create an overall popularity measure for the video stream. In one implementation, the search system 130 may weight the various popularity determinations such that all four of the popularity measures 721-724 may be considered, however, one such measure may be weighted more heavily than the others. (730). By weighting one popularity determination more than another, the weighted popularity determination may have more influence on the overall popularity measure for the video stream.

The search system then determines an overall popularity of the video stream based on the various popularity determinations (740). In some implementations, the search system may multiply each popularity determination by its assigned weight and then add the weighted popularity determinations together to determine the overall popularity of the video stream.

The following formula illustrates how the four popularity measures may be used in combination where one or more of the popularity measures are weighted.

$$(W_1 * P_1) + (W_2 * P_2) + (W_3 * P_3) + (W_4 * P_4) = \text{Total Popularity}$$

where $P_n$ represents an nth popularity value that is being considered and $W_n$ represents a weight for the popularity value n. Some popularity determinations may be assigned a weight of zero, such that they play no role in determining the popularity of the video stream. If a single one of the popularity determinations is to be used as the overall popularity of the video stream, all other popularity values may be assigned a weight of zero.

For example, a video stream that includes the music video for the song "Rio" by the band Duran Duran may include a first popularity measure (corresponding to 721) of 50, a second popularity measure (corresponding to 722) of 25, a third popularity measure (corresponding to 723) of 75, and a fourth popularity measure (corresponding to 724) of 25. The first popularity measure may be weighted to indicate that although all four popularity measures associated with the video stream are to be considered, the first popularity measure is more important than the other three. As such, the total popularity for the video stream can be determined based on the following formula.

$$(1.5 * 50) + (1.0 * 25) + (1.0 * 75) + (1.0 * 25) = 200$$

As such, the total popularity for the video stream that includes the "Rio" music video may be represented by the value 200.

The search system 130 stores the overall popularity in association with the essence fingerprint for the video stream in the video stream fingerprint database 140 (750). As such, and for example, during process 200 of FIG. 2, the search system 130 may access the video stream fingerprint database 140 to determine popularity for a particular video stream. To do so, the search system 130 may access an entry in the video stream fingerprint database 140 related to a particular video stream and further access a popularity associated with the particular video stream and stored within the entry. The accessed popularity may be used by the search system 130 to determine a presentation of search results to a user.

Figure 8:
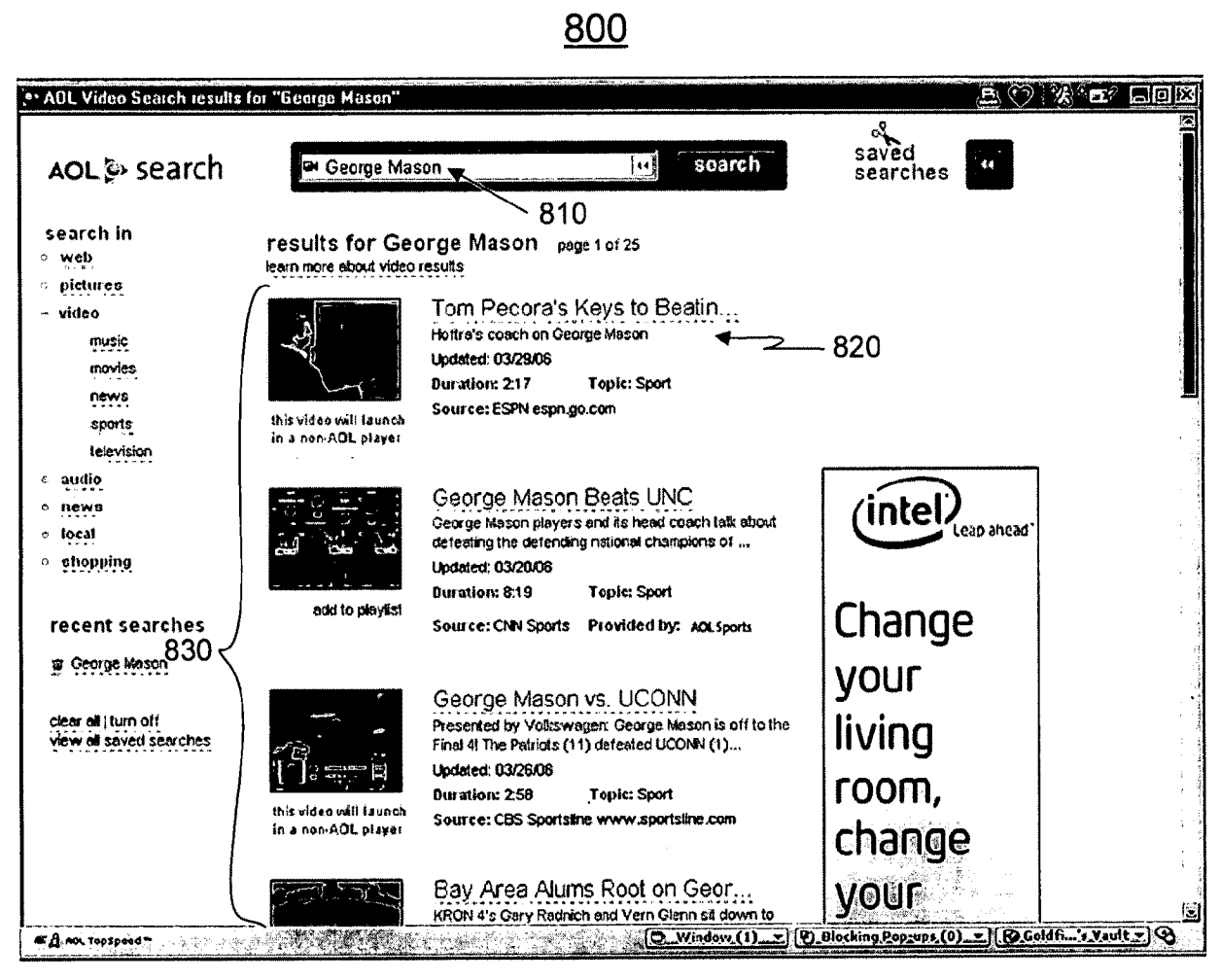

UI 800 of FIG. 8 is configured to display search results 830 that correspond to video streams that satisfy a video search query. More particularly, UI 800 displays search results 830 that correspond to video streams related to the video search query "George Mason." The search query is a video search query because it has been entered by a user into a specialty search engine, as shown by the video camera icon 810 in the video search query text entry box at the top of the UI 800 display.

The search results 830 may be ranked or grouped according to the popularity of the video streams corresponding to the search results 830. For example, the search result 820 corresponding to the video stream having content related to Hofstra University Basketball Coach Tom Pecora may be at the top of the search result list because it is the most popular video stream that satisfies the "George Mason" video search query. Each search result 830 includes an embedded link that enables a video stream to be launched in response to selection of the corresponding search result by a user (e.g., by clicking on or selecting using a mouse or other input device the text or the picture of the video displayed in the search result).

Again, popularity may be determined by a number of links that reference the video stream, popularity of a web page that includes the stream and the popularity of the subject matter of, or content included within, the video stream, or some combination thereof, as described above. The search results 830 also may be ranked or grouped based on other factors, such as a number of times a particular video stream has been downloaded during a specific time frame, a popularity of words included in the video stream, a last date on which the video stream was updated, duration of the video stream, a topic related to the video stream or some other criteria. Importantly, the search results 830 displayed in UI 800 in response to the video search query do not refer to the same video stream. In other words, the search results 830 are not duplicates.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A method for storing fingerprints for multimedia streams, the method comprising the following operations performed with one or more processors:
    identifying a multimedia stream associated with a link, the multimedia stream comprising content and metadata that describes content;
    removing the metadata from the stream and encoding the content using a compression algorithm to generate a fingerprint for the multimedia stream, the fingerprint comprising a set of unique bits;
    comparing the generated fingerprint to at least one fingerprint stored in a fingerprint database;
    determining, based on the comparison, whether the generated fingerprint matches at least one fingerprint stored in the fingerprint database;
    storing the generated fingerprint in the fingerprint database when it is determined that there is not a match to the generated fingerprint;
    creating a canonical resource locator for the identified multimedia stream by resolving the link and at least one other link into a simplified format; and
    associating the canonical resource locator with the generated fingerprint.

2. The method of claim 1, further comprising:
    increasing a canonical resource locator counter associated with the fingerprint.

3. The method of claim 2, further comprising:
    determining a popularity of the multimedia stream based on a value of the canonical resource locator counter associated with the fingerprint.

4. The method of claim 2, further comprising:
    receiving a query related to the multimedia stream;
    comparing the query to at least one fingerprint stored in the fingerprint database; and
    determining, based on the comparison, a search result.

5. The method of claim 1, wherein the compression algorithm comprises a hash coding compression algorithm.

6. The method of claim 1, wherein the metadata comprises at least one from the group comprising:
    a stream identification: a title of the stream; a date on which the stream was published; a stream format; a size associated with the stream; a bit rate associated with the stream; and a keyword associated with the stream.

7. The method of claim 1, wherein the simplified format comprises a path and at least one of an IP address and a server name.

8. The method of claim 1, wherein creating a canonical resource locator comprises:
    identifying the at least one other link;
    determining that the link and the at least one other link have different formats; and standardizing the link and the at least one other link into a single format.

9. The method of claim 1, further comprising:
    comparing the canonical resource locator to at least one stored canonical resource locator;
    determining, based on the comparison, whether the canonical resource locator matches at least one stored canonical resource locator; and
    storing the canonical resource locator in the fingerprint database when it is determined that there is not a match to the stored canonical resource locator.

10. The method of claim 1, further comprising:
    comparing the canonical resource locator to at least one stored canonical resource locator;
    determining, based on the comparison, whether the canonical resource locator matches at least one stored canonical resource locator; and
    discarding the canonical resource locator when it is determined that there is not a match to the stored canonical resource locator.

11. The method of claim 1, further comprising:
    detecting the link that has the associated multimedia stream by parsing an Internet webpage for at least one of a predetermined file extension and a keyword associated with the multimedia stream.

12. A non-transitory computer readable medium storing instructions that, when executed by at least one processor, cause the processor to perform the following operations:

identifying a multimedia stream associated with a link, the multimedia stream comprising content and metadata that describes content;

removing the metadata from the stream and encoding the content using a compression algorithm to generate a fingerprint for the multimedia stream, the fingerprint comprising a set of unique bits;

comparing the generated fingerprint to at least one fingerprint stored in a fingerprint database;

determining, based on the comparison, whether the generated fingerprint matches at least one fingerprint stored in the fingerprint database;

storing the generated fingerprint in the fingerprint database when it is determined that there is not a match to the generated fingerprint;

creating a canonical resource locator for the identified multimedia stream by resolving the link and at least one other link into a simplified format; and associating the canonical resource locator with the generated fingerprint.

13. The computer readable medium of claim 12, wherein the instructions further cause the at least one processor to perform the operation of:

increasing a canonical resource locator counter associated with the fingerprint.

14. The computer readable medium of claim 13, wherein the instructions further cause the at least one processor to perform the operation of:

determining a popularity of the multimedia stream based on a value of the canonical resource locator counter associated with the fingerprint.

15. The computer readable medium of claim 12, wherein creating a canonical resource locator comprises:

identifying the at least one other link;

determining that the link and the at least one other link have different formats; and standardizing the link and the at least one other link into a single format.

16. The computer readable medium of claim 12, wherein the instructions further cause the at least one processor to perform the operations of:

comparing the canonical resource locator to at least one stored canonical resource locator;

determining, based on the comparison, whether the canonical resource locator matches at least one stored canonical resource locator; and storing the canonical resource locator in the fingerprint database when it is determined that there is not a match to the stored canonical resource locator.

17. A system for processing multimedia streams, the system comprising:

a storage device; and at least one processor coupled to the storage device, wherein the storage device stores a program for controlling the processor, and wherein the processor, operative with the program, is configured to:

identify a multimedia stream associated with a link, the uitimedia stream comprising content and metadata that describes content;

remove the metadata from the stream and encode the content using a compression algorithm to generate a fingerprint for the multimedia stream, the fingerprint comprising a set of unique bits;

compare the generated fingerprint to at least one fingerprint stored in a fingerprint database;

determine, based on the comparison, whether the generated fingerprint matches at least one fingerprint stored in the fingerprint database;

store the generated fingerprint in the fingerprint database when it is determined that there is not a match to the generated fingerprint;

create a canonical resource locator for the identified multimedia stream by resolving the link and at least one other link into a simplified format; and associate the canonical resource locator with the generated fingerprint.

18. The system of claim 17, wherein the at least one processor is further configured to:

increase a canonical resource locator counter associated with the fingerprint; and determine a popularity of the multimedia stream based on a value of the canonical resource locator counter associated with the fingerprint.

19. The system of claim 17, wherein to create a canonical resource locator the at least one processor is further configured to:

identify the at least one other link;

determine that the link and the at least one other link have different formats; and standardize the link and the at least one other link into a single format.

20. The system of claim 17, wherein the at least one processor is further configured to:

compare the canonical resource locator to at least one stored canonical resource locator;

determine, based on the comparison, whether the canonical resource locator matches at least one stored canonical resource locator; and store the canonical resource locator in the fingerprint database when it is determined that there is not a match to the stored canonical resource locator.

* * * * *